United States Patent

Organek et al.

Patent Number: 6,082,504
Date of Patent: Jul. 4, 2000

[54] FRICTION BRAKE DEVICE UTILIZING DUAL BALL RAMP DEVICES

[75] Inventors: Gregory J. Organek, White Fish Bay, Wis.; David M. Preston, Clarkston, Mich.

[73] Assignee: Eaton Corporation, Cleveland, Ohio

[21] Appl. No.: 09/160,672

[22] Filed: Sep. 25, 1998

[51] Int. Cl.$^7$ .................................................. F16D 55/08
[52] U.S. Cl. ...................... 188/72.7; 188/71.2; 188/71.4; 188/72.9; 192/35
[58] Field of Search .................................. 188/71.2, 71.3, 188/71.4, 71.5, 72.7, 72.9, 134; 192/35, 54.52

[56] References Cited

U.S. PATENT DOCUMENTS

| | | |
|---|---|---|
| 3,313,381 | 4/1967 | Harting et al. . |
| 4,352,415 | 10/1982 | Powell . |
| 4,805,486 | 2/1989 | Hagiwara . |
| 5,033,591 | 7/1991 | Price ........................................ 188/71.4 |
| 5,038,895 | 8/1991 | Evans ........................................ 188/72.7 |
| 5,322,146 | 6/1994 | Holl et al. . |
| 5,485,904 | 1/1996 | Organek et al. ........................... 192/35 |
| 5,505,285 | 4/1996 | Organek ..................................... 192/35 |
| 5,528,950 | 6/1996 | Organek et al. . |
| 5,529,150 | 6/1996 | Buckley et al. ........................ 188/72.9 |

*Primary Examiner*—Robert J Oberleitner
*Assistant Examiner*—Mariano Sy
*Attorney, Agent, or Firm*—Loren H. Uthoff, Jr.

[57] ABSTRACT

A friction brake assembly for applying a braking torque to a rotating shaft such as a transmission output shaft utilizing a primary ball ramp mechanism having a control ring and activation ring with opposed variable depth grooves and rolling members disposed therebetween to load a friction brake in response to a secondary ball ramp mechanism which creates a braking torque on the control ring to activate the primary ball ramp mechanism in response to the rotation of a control lever. Rolling members disposed in opposed variable depth grooves formed in the control lever and a control plate force the control plate towards a housing extension thereby applying a friction force to a clamp ring where the clamp ring is connected to the control ring of the primary ball ramp mechanism using a flex extension to allow relative axial movement between the clamp ring and the control ring. In this manner, the friction brake assembly of the present invention can function as a vehicle parking brake.

14 Claims, 3 Drawing Sheets

FIG I

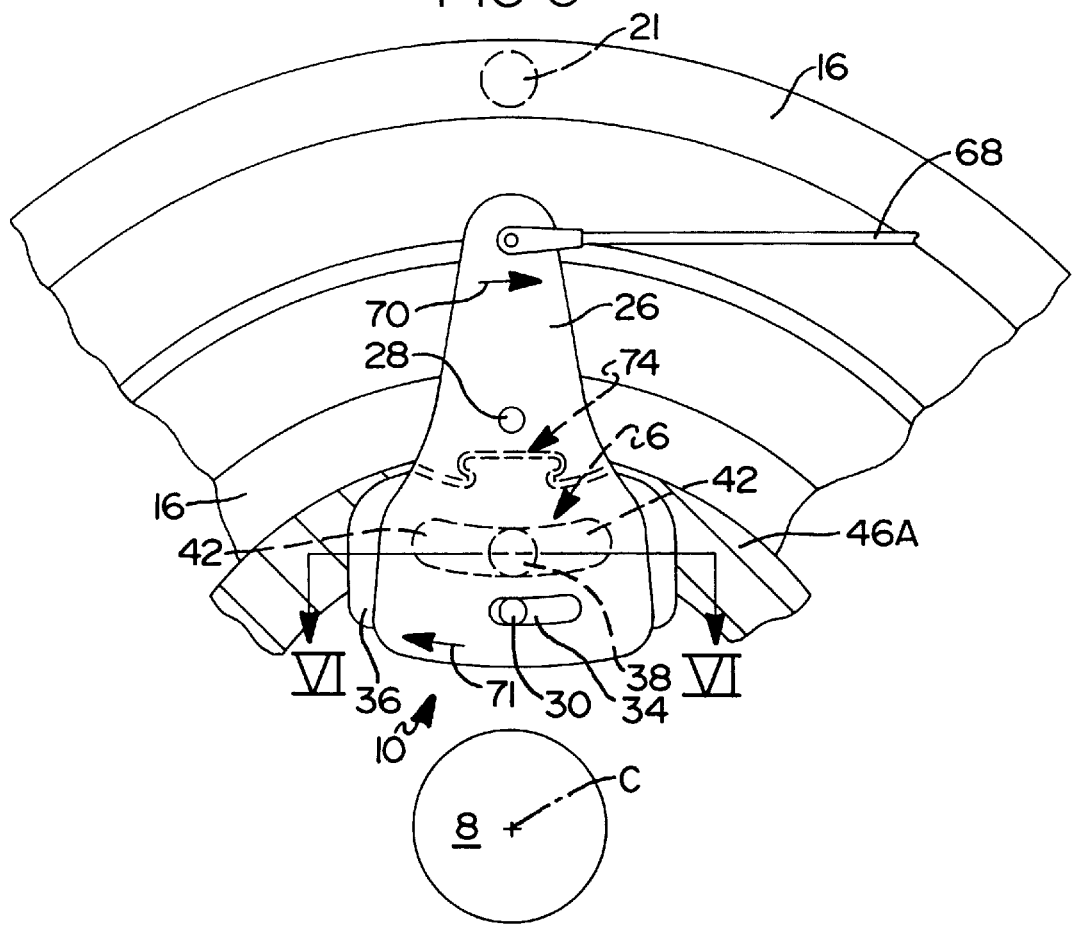
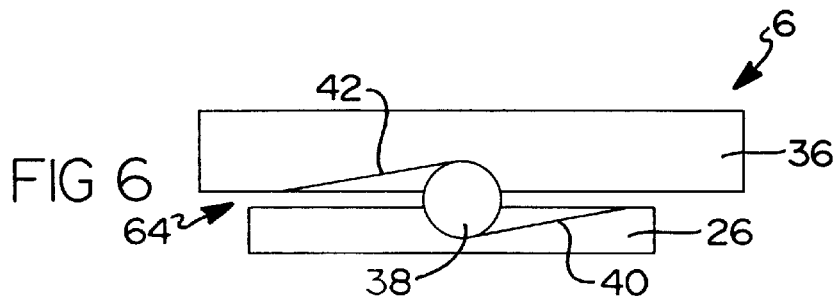
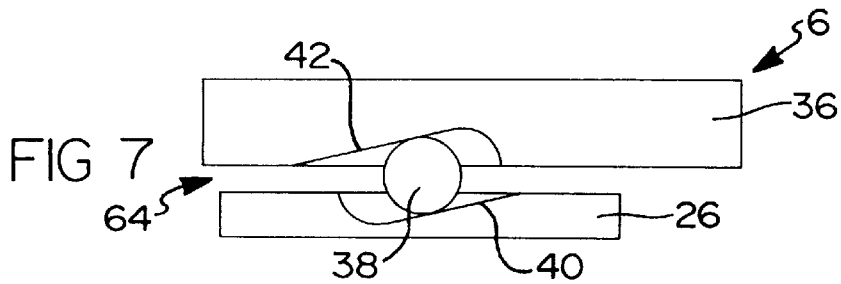

FRICTION BRAKE DEVICE UTILIZING DUAL BALL RAMP DEVICES

The present invention relates to a friction brake device, more specifically, the present invention relates to a friction brake device activated using primary and secondary ball ramp mechanisms to brake a rotating shaft such as a transmission output shaft.

PRIOR ART

Ball ramp mechanisms are known in the art and have been adapted to provide an actuation force in vehicle brakes and in transmission retarders. However, these systems typically make use of an electromagnetic coil assembly to introduce a retarding torque on a control ring in the ball ramp mechanism thereby causing the rolling elements to transerve tapered ramps (grooves) forcing the control plate away from the actuation plate. The ball ramp axial force is generated in response to the electromagnetic force produced by a coil.

U.S. Pat. No. 3,313,381, G. R. Harting et. al.; U.S. Pat. No. 4,352,415 Powell and 5,322,146 Holl et. al., the disclosures of which are hereby incorporated by reference, describe braking devices which are actuated using a ball ramp mechanism. The ball ramp mechanism moves in response to the electrical excitation of a coil which electromagnetically causes a torque to be applied to a control ring of a ball ramp mechanism which then axially expands to load a friction element to provide a braking force.

U.S. Pat. No. 5,528,950, the disclosure of which is hereby incorporated by reference, describes a transmission inertia brake which uses a ball ramp mechanism to load a clutch pack to provide a braking action to a rotating transmission shaft in response to an electrical current supplied to a coil. The coil electromagnetically activates a cone clutch which is nonrotationally connected to the control ring of the ball ramp mechanism.

SUMMARY OF THE INVENTION

The present invention incorporates a primary ball ramp mechanism which axially expands to load a friction brake to provide a braking force to a rotating driveline component such as a transmission output shaft. The control ring of the primary ball ramp mechanism is controlled by a secondary ball ramp mechanism. A control lever is rotated by either an electric or pneumatic actuator or mechanically by the operator through a cable device. The control lever and an opposing control plate both have variable depth grooves in which a rolling member contacts to form the secondary ball ramp mechanism. Upon rotation of the control lever, the secondary ball ramp mechanism expands and frictionally applies a torque to the control ring of the primary ball ramp mechanism. Using the present invention, a cable operated secondary ball ramp mechanism is used to activate a primary ball ramp mechanism which loads a friction brake to provide a braking force to a rotating component such as a transmission output shaft. In this manner, the present invention is particularly suited to be used as a vehicle parking brake.

One provision of the present invention is to provide a primary ball ramp mechanism controlled by a secondary ball ramp mechanism.

Another provision of the present invention is to provide a primary ball ramp mechanism controlled by a secondary ball ramp mechanism which is activated using a cable.

Another provision of the present invention is to provide a primary ball ramp mechanism to load a friction brake which is activated using a secondary ball ramp mechanism.

Another provision of the present invention is to provide a primary ball ramp mechanism to load a friction brake which is activated using a secondary ball ramp mechanism where the secondary ball ramp mechanism includes a control lever rotated by an axially displaced cable.

Still another provision of the present invention is to provide a primary ball ramp mechanism to load a friction brake to provide a braking force to a transmission output shaft where the primary ball ramp mechanism is controlled by a secondary ball ramp mechanism activated by a control lever.

BRIEF DESCRIPTION OF THE DRAWINGS

FIG. 5 is a partial cross-sectional view of the control means of the present invention taken along line V—V of FIG. 1;

FIG. 6 is a partial cross-sectional view of the secondary ball ramp mechanism of the present invention taken along line VI—VI of FIG. 5 in an unactivated state; and FIG. 7 is a partial cross-sectional view of the secondary ball ramp mechanism of the present invention taken along line VI—VI of FIG. 5 in an activated state.

DETAILED DESCRIPTION OF THE PREFERRED EMBODIMENT

Figure 1:
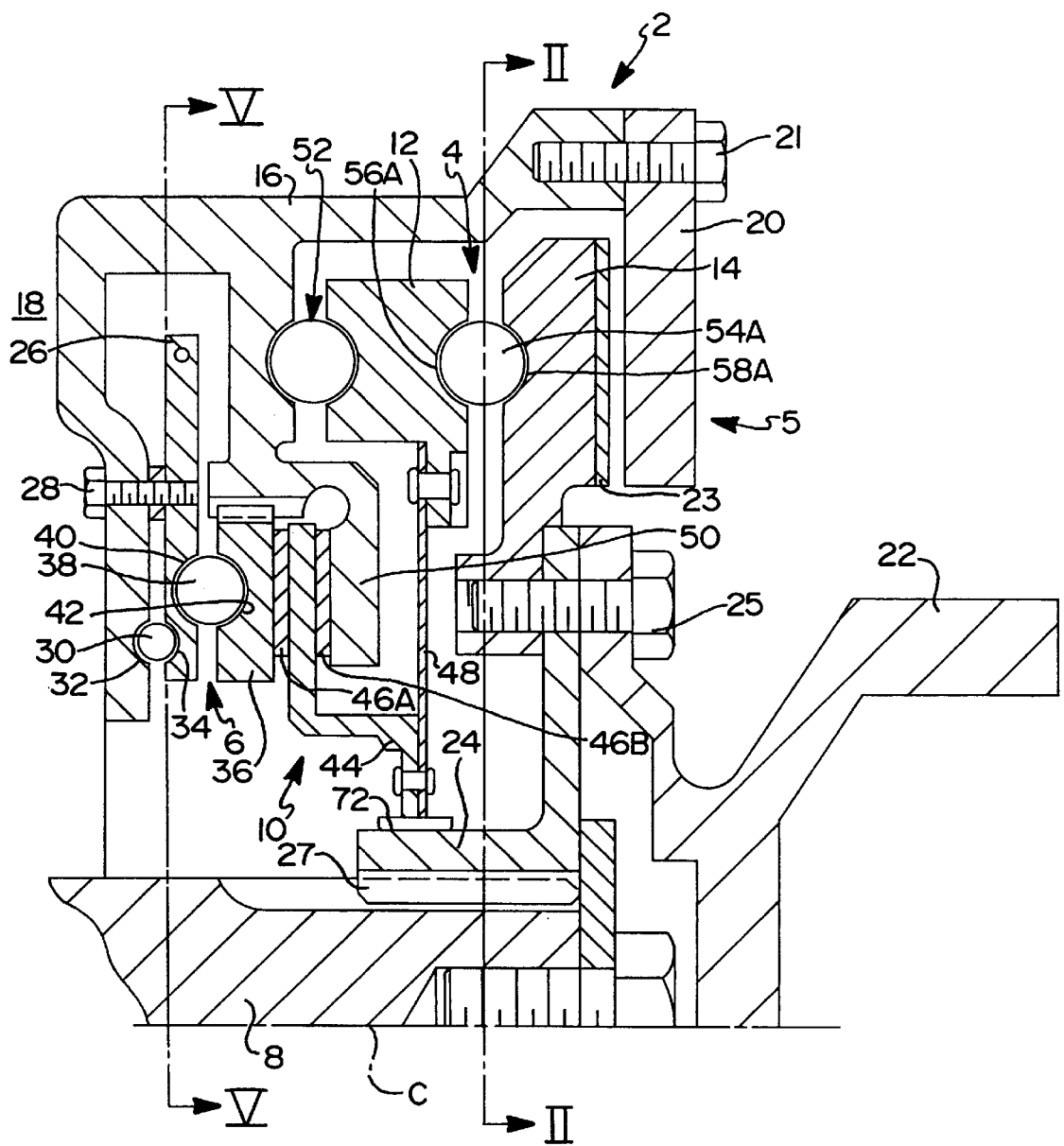
FIG. 1 is a cross-sectional view of the present invention.

For purposes of promoting an understanding of the principals of the invention, reference will now be made to the embodiment illustrated in the drawings and specific language will be used to describe same. It will nevertheless be understood that no limitation of the scope of the invention is thereby intended, such alterations and further modifications in the illustrated device, and such further applications of the principals of the invention as illustrated therein being contemplated as would normally occur to one skilled in the art to which the invention relates.

In this disclosure, certain terminology will be used in the following description for convenience in reference only and will not be limiting. For example, the terms "forward" and "rearward" will refer to directions forward and rearward of the inertia brake as installed on a transmission. The terms "rightward" and "leftward" will refer to directions in the drawings in connection with which the terminology is used. The terms "inwardly" and "outwardly" will refer to directions toward and away from, respectively, the geometric center of the brake assembly of the present invention. The terms "upward" and "downward" will refer to directions as taken in the drawings in connection with which the terminology is used. All foregoing terms mentioned above include the normal derivations and equivalents thereof.

Now referring to FIG. 1 of the drawings, a cross-sectional view of the friction brake assembly 2 of the present invention is shown. One function of the friction brake assembly 2 is to provide bidirectional braking to a vehicle driveline so as to function as a parking brake in response to an input from the driver/operator. A primary ball ramp mechanism 4 is the actuation means that is used to load a friction brake 5 to provide a braking force on a rotating shaft such as a transmission output shaft 8. A secondary ball ramp mechanism 6 provides a control force to activate the primary ball ramp mechanism 4 to provide the braking of the vehicle driveline and the instant case that braking force is applied to a transmission output shaft 8 although the brake assembly 2 could be adapted to provide rotational braking at any suitable point along the vehicle driveline.

The actuation of the primary ball ramp mechanism 4 is controlled by control means 10 which includes the secondary ball ramp mechanism 6 as the force producing mechanism to provide a rotational torque on a control ring 12 of the primary ball ramp mechanism 4 to cause it to rotate relative to the activation ring 14. The primary ball ramp mechanism 4 and the secondary ball ramp mechanism 6 are contained within the housing 16 which is mounted to the transmission housing 18. A brake surface 20 is mounted to the housing 16 with fastener 21 and provides a surface for the activation ring 14 to react against to provide frictional braking through a friction facing 23 which is shown attached to the activation ring 14 but could be attached to the brake surface 20. The activation ring 14 is attached to the transmission output yoke 22 and the shaft drive ring 24 with fastener 25 both the activation ring 14 and the output yoke are nonrotationally connected to the transmission output shaft 8 through the shaft drive ring 24 which is connected to the transmission output shaft 8 with splines 27. Generally, all the components rotate around centerline C.

The control lever 26 is rotatably supported on support pin 28 which extends from the housing 16 and is rotated by the pulling of cable 68 (see FIG. 5) by action of either the operator or by action of some type of electronic, pneumatic or hydraulic device sufficient to provide a pulling force on the cable 68 when a braking force is desired. The control lever 26 rotates on support pin 28 which is axially supported against the housing 16 by the thrust ball 30 travelling in the housing ball groove 32 and an opposing lever ball groove 34. The housing ball groove 32 and the opposing lever ball groove 34 both have a centerline radius from the support pin 28 to provide free motion as the lever 26 rotates. Note that an alternative embodiment could provide a circular plate like lever disc that is supported on a first side by three or more thrust balls 30 travelling in three or more pairs of respective housing ball grooves 32 and opposing lever ball grooves 34 such that the lever disc would rotate about the centerline C. Support pin 28 would not be used. This configuration would also require the use of three or more rolling members 38 traveling in three or more pairs of respective lever ramp 40 and opposing plate ramps 42.

The secondary ball ramp mechanism 6 includes a rolling member 38 which contacts variable depth opposed grooves (ramps). Within the lever a lever ramp 40 is formed and in the clamp plate 36 a plate ramp 42 is formed. FIGS. 5–7 illustrate the shape of these ramps 40 and 42. As the lever 26 is rotated on support pin 28, rolling member 38 rolls in both the lever ramp 40 and the plate ramp 42 causing the clamp plate 36 to axially separate from the lever 26 thereby increasing the clamping force on the clamp ring 44 and the friction rings 46A and 46B bounded thereto. When the control lever 26 is rotated, the clamp ring 44 is clamped between the clamp plate 36 and the housing extension 50 which is part of the housing 16 thereby providing a braking torque on the control ring 12 of the primary ball ramp mechanism 4. The clamp ring 44 is attached to the control ring 12 with an extension 48 which is relatively axially flexible to allow for some relative axial movement between the control ring 12 and the clamp ring 44 as the friction rings 46A and 46B wear and as the control means 10 functions.

The control ring 12 reacts axially against the thrust bearing 52 to hold the control ring 12 in axial position relative to the housing 16. As the clamp ring 44 is clamped between the clamp plate 36 and the housing extension 50 (upon rotation of the lever 26 and activation of the secondary ball ramp mechanism 6) a retarding rotational torque is applied to the control ring 12 of the primary ball ramp mechanism 4 through the extension 48. If the transmission output shaft 8 is rotating, the control ring 12 will rotate relative to the activation ring 14 and the rolling elements 54A, 54B, 54C will roll both along their respective control ramps 56A, 56B, 56C and their respective activation ramps 58A, 58B, 58C (see FIGS. 2–4) causing the activation ring 14 to move axially away from the control ring 12 thereby forcing the friction facing 23 mounted on the activation ring 14 into the brake surface 20 which results in a braking force being applied to the output shaft 8. The primary ball ramp mechanism 4 is designed to axially expand if the control ring 12 is rotated in a clockwise or counter-clockwise direction relative to the activation ring 14 (see FIGS. 2–4).

Figure 2:
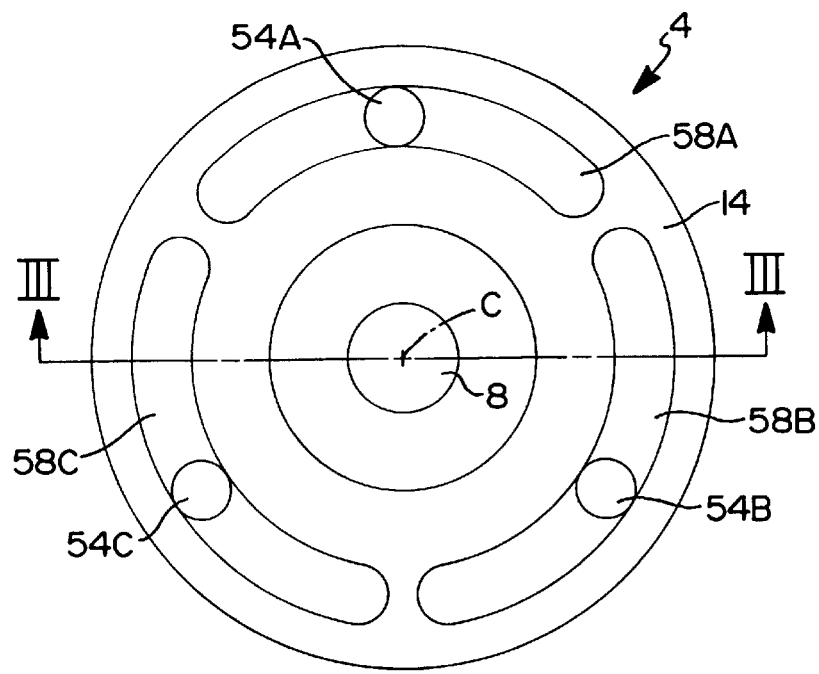
FIG. 2 is a partial cross-sectional view of the primary ball ramp mechanism of the present invention taken along line II—II of FIG. 1.
Figure 3:
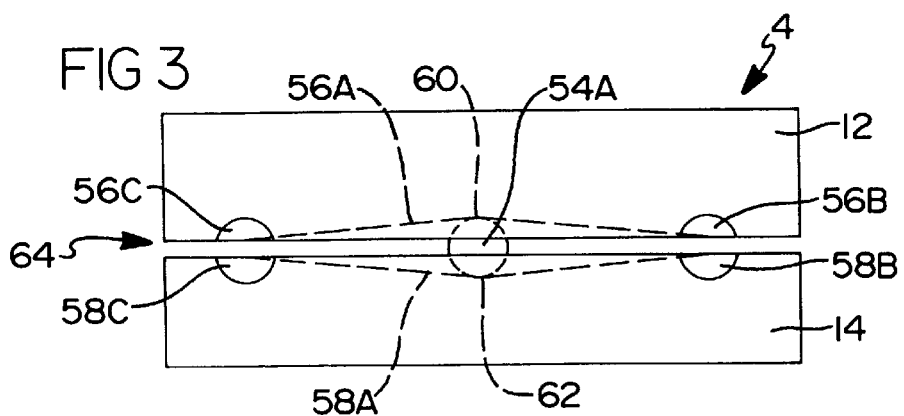
FIG. 3 is a partial cross-sectional view of the primary ball ramp mechanism of the present invention taken along line III—III of FIG. 2 in an unactivated state.
Figure 4:
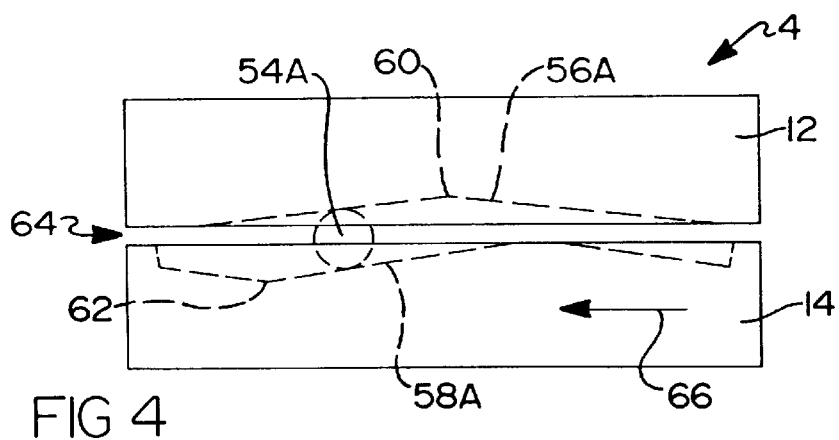
FIG. 4 is a partial cross-sectional view of the primary ball ramp mechanism of the present invention taken along line III—III of FIG. 2 in an activated state.

Now referring to FIGS. 2–4 of the drawings, a partial cross-sectional view taken along line II—II of FIG. 1 of the present invention is shown in FIG. 2 to better illustrate the operation of the primary ball ramp mechanism 4.

Three spherical rolling members 54A, 54C, 54B are spaced approximately 120° apart rolling in three variable depth grooves 56A, 56B, 56C formed in the control ring 12 and three variable depth grooves 58A, 58B, 58C formed in the activation ring 14 respectively as the control ring 12 is rotated relative to the activation ring 14. Any number of spherical rolling members 54A and respective grooves 56A and 58A could be utilized depending on the desired rotation and axial motion of the primary ball ramp actuator 4. It is desirable to employ at least three spherical rolling members 54A, 54B, 54C travelling on a like number of identical equally spaced opposed pairs of variable depth grooves 56A and 58A, 56B and 58B, and 56C and 58C formed respectively in the control ring 12 and the activation ring 14 to provide stability to the control ring 12 and the activation ring 14. Any type of low friction device which would roll along the grooves 56A, 56B, 56C, 58A, 58B, and 58C could be utilized for the rolling members 54A, 54B and 54C such as a balls or a rollers.

Three semi-circular, circumferential by extending variable depth grooves 56A, 56B and 56C are shown formed in the face of the control ring 12 with corresponding identical opposed variable depth grooves 58A, 58B and 58C formed in the face of the pressure ring 14. The grooves 56A, 56B, 56C, 58A, 58B and 58C vary in axial depth according to the circumferential position in the ramp and circumferentially extend for approximately 120 degrees (actually less than 120° to allow for a separation section between the ramps). Any number of opposed ramps and associated rolling members could be utilized depending on the desired range of rotation and needed axial travel of the ball ramp mechanism 4. The axial depth is at a maximum at the center of grooves 56A, 56B, 56C, 58A, 58B and 58C and at a minimum at each end. The control ring 12 and the activation ring 14 are made of a high strength steel with the grooves 56A, 56B, 56C, 58A, 58B and 58C carburized and hardened to $R_c$ 55–60. The axial separation 64 shown in FIGS. 3 and 4 between the control ring 12 and the pressure ring 14 is determined by the rotational orientation between the two corresponding opposed ramps such as 56A and 58A where the spherical rolling member 54A rolls along each ramp 56A and 58A as the control ring 12 is rotated relative to the pressure ring 14 on the axis of rotation C. The relative rotation forces the control ring 12 and the pressure ring 14 apart or allows them to come closer together as determined by the position of the rolling members 54A, 54B and 54C on their respective groove pairs 56A, 58A and 56B, 58B and 56C, 58C thereby providing an axial movement for clamping the friction facing 23 between the activation ring 14 and the brake surface 20 (see FIG. 1).

FIG. 3 illustrates the rotational orientation of the control ring 12 and the activation ring 14 when the axial separation 64 is at a minimum since the grooves 56A and 58A are aligned and the rolling member 54A is in the deepest section of the grooves 56A and 58A.

The control ring 12 is rotated relative to the activation ring 14 by application of a torque input created by the control means 10 which includes the secondary ball ramp mechanism 6 which is activated by rotating the control lever 26. The secondary ball ramp mechanism 6 axially expands and clamps the clamp ring 44 between the clamp plate 36 and the housing extension 50. In this manner, the control ring 12 is frictionally connected to the housing 16 which results in relative rotation motion between the control ring 12 and the activation ring 14 thereby activating the primary ball ramp mechanism 4. The clamp ring 44 is connected to the control ring 12 with a flexible extension 48 which allows for axial movement of the clamp ring 44 and the control ring 12. If there is relative rotational motion between the control ring 12 and the output shaft 8, the control means 10 applies a retarding torque to the control ring 12 that causes the control ring 12 to rotate relative to the activation ring 14 which in turn causes the grooves 56A, 56B and 56C in the control ring 12 to move relative to respective grooves 58A, 58B and 58C in the activation ring 14. This relative rotational motion results in an increase in the axial separation 64 (see FIG. 4) between the control ring 12 and the activation ring 14 as the rolling members 54A, 54B and 54C assume new positions in their respective groove pairs 56A, 58A and 56B, 58B and 56C, 58C. The increased axial separation 64 forces the friction facing 23 into the brake surface 20 which frictionally couples the output shaft 8 to the housing 16. In the case where the output shaft 8 is a transmission output shaft 8, the output shaft 8 is mated to the vehicle driveshaft (not shown) for power transfer to the balance of the driveline. The relative rotation of the control ring 12 to the activation ring 14 is clearly illustrated in FIGS. 3 and 4 by the relative shift in position of reference points 60 and 62 from directly opposed in FIG. 3 to an offset position in FIG. 4 caused by rotation of the control ring 12 in the direction of the arrow 66. Note that the ramps 56B, 56C, 58B and 58C are not shown in FIG. 4.

Referring once again to FIG. 1, the control ring 12 reacts against the housing 16 through thrust bearing, so as to axially move the activation ring toward the brake surface 20. This axial displacement can be used for a variety of applications since the axial force generated by the activation ring 14 relative to the torque applied to the control ring 12 is quite high, typically a ratio of 100:1. Additional illustrative details of operation of a ball ramp actuator can be found by reference to U.S. Pat. No. 4,805,486, the disclosure of which is hereby incorporated by reference.

Now referring to FIGS. 5–7 of the drawings, FIG. 5 shows a partial cross-sectional view taken along line V—V of FIG. 1 of the present invention. FIGS. 6 and 7 of the drawings show a cross-sectional view of the present invention as shown in FIG. 5 taken along line VI—VI in a unactivated and in an activated state respectively.

A cable 68 is pulled through action of the driver/operator to set the brake to prevent the vehicle driveline from turning. The cable 68 rotates the control lever 26 in a direction shown by arrows 70 and 71 around the support pin 28 thereby causing the rolling element 38 of the control means 10 to roll along the lever ramp 40 and the plate ramp 42 from the initial unactivated position as shown in FIG. 6 where the axial separation 64 is at a minimum, to the activated state shown in FIG. 7 where the axial separation has been increased due to the rolling element 38 rolling to a new position along the variable depth lever ramp 40 and plate ramp 42. The increased axial separation causes the clamp plate 36 to squeeze the clamp ring 44 between it and the housing extension 50 against the friction rings 46A and 46B which are shown bonded to the clamp ring 44 but could be bonded to the clamp plate 36 and the housing extension 50 respectively. The clamp plate 36 is slidingly supported on the housing 16 with a groove 74 formed in the housing 16 and a mating tongue formed in the clamp plate 36 allowing axial movement of the clamp plate 36 toward and away from the housing extension 50. When the lever 26 is not rotated by the cable 68, the control ring 12 is allowed to rotate freely relative to the activation ring 14 being rotationally supported on bearing 72. Bearing 72 is optional depending on the support provided by the thrust bearing 52.

The lever 26 is axially restrained by thrust ball 30 rolling in the lever ball groove 34 and the housing ball groove 32 (see FIG. 1). The secondary ball ramp mechanism 6 forces the clamp plate 36 towards the friction ring 46A which generates a clamping force on the clamp ring 44 reacting against the thrust ball 30. FIG. 6 is a cross-sectional view of the secondary ball ramp mechanism 6 of the present invention taken along line VI—VI of FIG. 5 showing the secondary ball ramp mechanism 6 in an initial nonenergized state where the separation 64 is at a minimum.

FIG. 7 is a cross-sectional view of the secondary ball ramp mechanism 6 of the present invention taken along line VI—VI of FIG. 5 showing the secondary ball ramp mechanism 6 in a partially energized state where the separation 64 has been increased to provide a clamping action on the clamp ring 44 between the clamp plate 36 and the housing extension 50 thereby applying a frictional braking torque on the control ring 12 which results in activation of the primary ball ramp mechanism 4 if the output shaft 8 is rotating.

Although the present invention has been described in certain terms, it will be apparent to those skilled in the art that various changes may be made without departing from the spirit and the scope of the invention as hereinafter claimed. It is therefore intended that the claims cover all such changes.

What is claimed is:

1. A friction brake comprising:

a housing having a cavity formed therein;

a shaft rotatable relative to said housing;

a brake surface extending from said housing;

a primary ball ramp mechanism disposed within said cavity comprising:

an activation ring disposed adjacent to said brake surface where axial movement of said activation ring results in a frictional loading and unloading of said activation ring against said brake surface; a control ring disposed opposing said activation ring, said control ring and said activation ring having opposed faces provided with circumferentially extending grooves, said grooves comprised of at least three opposed pairs of grooves having portions of varying depth with a maximum depth at a center and a minimum depth at either of two ends; rolling members disposed one in each opposed pair of said grooves; said grooves in said control ring and said activation ring being arranged so that relative angular movement of said control ring relative to said activation ring in either a clockwise or counterclockwise direction from a starting position thereof, causes said rolling members to roll along each opposed pair of said grooves thereby causing axial movement of said activation ring away from said control ring to axially load said activation ring against said brake surface thereby providing a braking torque on said shaft relative to said housing;

a clamp ring attached to said control ring;

a secondary ball ramp mechanism activated by the movement of a control lever creating a clamping force on said clamp ring to activate said primary ball ramp mechanism, said secondary ball ramp mechanism including at least one pair of opposed grooves formed in said secondary ball ramp mechanism, said grooves having a variable depth along their length and a rolling member disposed between said opposed grooves and wherein said secondary ball ramp mechanism further comprises a control plate axially slidingly supported by said housing and acted upon by said rolling member wherein the first of said pair of opposed grooves is formed in said control lever and the second of said pair of opposed grooves is formed in said control plate.

2. The friction brake of claim 1, wherein said secondary ball ramp mechanism includes a thrust bearing disposed between said control lever and said housing.

3. The friction brake of claim 1, further comprising a pair of friction rings attached on a first face and a second face of said clamp ring disposed to contact and to be clamped between said control plate and a housing extension wherein said first face contacts said control plate and said second face contacts said housing extension, said housing extension extending from said housing.

4. The friction brake of claim 1, further comprising a thrust bearing disposed between said control ring and said housing.

5. The friction brake of claim 1, wherein said activation ring is nonrotatably attached to said shaft through a shaft drive ring.

6. The friction brake of claim 1, wherein said activation ring is attached to said shaft drive ring and to a transmission output yoke.

7. A vehicle parking brake comprising:

a housing having a cavity formed therein;

a shaft rotatable relative to said housing;

a brake surface extending from said housing;

a primary ball ramp mechanism comprising:

an activation ring adjacent to said brake surface and nonrotatably attached to said shaft where axial movement of said activation ring results in a frictional contacting and noncontacting of said brake surface by said activation ring; a control ring disposed adjacent to said activation ring and axially separated from said activation ring by at least three rolling members each contained in circumferentially extending grooves formed in opposed faces of said activation ring and said control ring, said grooves having portions of varying depth with the grooves on said activation ring and said control ring being arranged so that relative angular movement of said control ring and said activation ring from a starting point causes axial movement of said activation ring away from said control ring to axially force said activation ring toward said brake surface;

a secondary ball ramp mechanism comprising:

a control lever rotationally supported on said housing and having a variable depth groove formed in a first face of said control lever; a clamp plate axially slidingly supported on said housing having a variable depth groove formed in a first face of said clamp plate, said groove in said clamp plate being substantially opposed to said groove formed in said control lever; a rolling member disposed in said grooves in said control lever and said clamp plate where upon rotation of said lever relative to said housing said rolling member rolls along said grooves thereby controlling the axial separation between said control lever and said clamp plate;

a clamp ring attached to said control ring where said clamp plate contacts said clamp ring and forces it toward said housing thereby clamping said clamp ring between said clamp plate and said housing and frictionally providing a braking torque through said clamp ring into said control ring to activate said primary ball ramp mechanism.

8. The vehicle parking brake of claim 7, further comprising an axial thrust bearing disposed between said control lever and said housing.

9. The vehicle parking brake of claim 7, further comprising a shaft drive ring connecting said activation ring to said shaft.

10. The vehicle parking brake of claim 7, wherein said shaft is a transmission output shaft.

11. The vehicle parking brake of claim 7, further comprising at least one friction ring disposed between said control plate and said clamp ring.

12. The vehicle parking brake of claim 7, further comprising a friction facing disposed between said activation ring and said brake surface.

13. The vehicle parking brake of claim 7, further comprising a flex extension to attach said clamp plate to said control ring, said flex extension allowing relative axial movement between said clamp plate and said control ring.

14. The vehicle parking brake of claim 7, wherein said grooves in said control ring and said grooves in said activation ring have a maximum axial depth at approximately a center point and a minimum axial depth at the either of two end points, said control ring and said activation ring being arranged so that relative angular movement of said control ring relative to said activation ring from a starting position thereof, causes axial movement of said activation ring away from said control ring to cause said activation ring to frictionally contact said brake surface thereby providing a braking torque on said shaft relative to said housing.

* * * * *